(12) United States Patent
Valencia et al.

(10) Patent No.: US 7,226,104 B2
(45) Date of Patent: Jun. 5, 2007

(54) VEHICLE TOOL GUIDE STRUCTURE

(75) Inventors: Michael Valencia, W. Bloomfield, MI (US); David Coakley, Macomb Township, MI (US); Mark Odulio, Windsor (CA)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 11/081,668

(22) Filed: Mar. 17, 2005

(65) Prior Publication Data

US 2006/0208538 A1 Sep. 21, 2006

(51) Int. Cl.
*B62D 43/04* (2006.01)

(52) U.S. Cl. .................. 296/37.2; 224/42.23; 414/463

(58) Field of Classification Search .............. 296/37.2, 296/37.3, 193.08; 414/463, 466; 211/23; 254/266, 323; 224/42.12, 42.13, 42.14, 42.21, 224/42.23, 42.41
See application file for complete search history.

(56) References Cited

U.S. PATENT DOCUMENTS

| 4,492,506 | A | | 1/1985 | Hoagland et al. |
| 4,915,358 | A | * | 4/1990 | Stallings ..................... 254/323 |
| 5,060,912 | A | | 10/1991 | Guarr |
| 5,188,341 | A | * | 2/1993 | Greaves ...................... 254/323 |
| 5,251,876 | A | * | 10/1993 | Stallings ..................... 254/323 |
| 5,638,711 | A | * | 6/1997 | Schotthoefer ................ 70/259 |
| 5,673,899 | A | | 10/1997 | Stallings |
| 5,681,137 | A | * | 10/1997 | Stallings ..................... 414/463 |
| 5,788,308 | A | * | 8/1998 | Yamagiwa ................. 296/37.2 |
| 5,836,182 | A | * | 11/1998 | Schotthoefer ................ 70/259 |
| 6,053,690 | A | | 4/2000 | Hanson |
| 6,220,574 | B1 | * | 4/2001 | Miller ........................ 254/323 |
| 6,390,760 | B1 | | 5/2002 | Affer et al. |

FOREIGN PATENT DOCUMENTS

| DE | 10258108 A | * | 6/2004 | |
| JP | 04342676 A | * | 11/1992 | ............. 224/42.23 |
| JP | 04345582 A | * | 12/1992 | ............. 224/42.23 |

* cited by examiner

*Primary Examiner*—D. Glenn Dayoan
*Assistant Examiner*—Paul Chenevert
(74) *Attorney, Agent, or Firm*—Global IP Counselors (57) ABSTRACT

A vehicle body supporting structure arrangement that an inner body member, an outer body member a manually operated mechanism and a tool guide tube. The inner body member has an inner aperture. The outer body member has an outer aperture that is offset with respect to the inner aperture. Further, the outer body member is coupled to the inner body member defining a body cavity therebetween. The manually operated mechanism is supported on the supporting structure. The tool guide tube is coupled to the inner and outer body members and extending through the body cavity to define a tool passageway between the inner and outer body members. An inner end portion of the tool guide tube is located in a position proximate the manually operated mechanism. The manually operated mechanism is accessed and operated by inserting a tool into and through the tool passageway.

28 Claims, 8 Drawing Sheets

VEHICLE TOOL GUIDE STRUCTURE

BACKGROUND OF THE INVENTION

1. Field of the Invention

The present invention generally relates to a vehicle tool guide structure. More specifically, the present invention relates to a vehicle equipped with a tool guide tube extending through a body cavity to define a tool passageway between the inner and outer body members for accessing a manually operated mechanism partially concealed under the vehicle.

2. Background Information

Most vehicles have a spare tire as standard equipment. Many pickup trucks, sport utility vehicles and vans have the spare tire mounted to the undercarriage of the vehicle. In the past, the spare tire was mounted to the undercarriage via a support bracket that held the tire against a cross member of the vehicle chassis. These support brackets usually required a person to hold the spare tire with one hand while securing the support bracket about the spare tire with the other hand. These support brackets can make it difficult for a person to install the spare tire beneath the vehicle, especially with a large tire. Moreover, lowering the tire often required the person to get at least underneath the vehicle to release the support bracket that is holding the spare tire.

More recently, hoisting mechanisms have been developed for raising and lowering the spare tire relative to the chassis of the vehicle. The hoisting mechanisms are often manually operated mechanisms that utilize the spare tire jack handle to operate the hoisting mechanism to raise and lower the spare tire. Since such spare tire hoisting mechanisms are hidden from view under the vehicle, they are often difficult to access. As mentioned above, some spare tire hoisting mechanisms require a tool that engages the device for releasing the spare tire. Accordingly, spare tire hoisting mechanisms have been developed that allow a person to access the spare tire hoisting mechanism without getting underneath the vehicle. Typically, the vehicle structure includes one or more tool access apertures in one or more structural members or body parts. The apertures allow a person to insert the tool and operate the spare tire hoisting mechanisms. One problem with providing these apertures in these vehicle structural members or body parts is that debris, water and other undesirable contaminants can get trapped in the areas around the apertures. Such debris and water can cause corrosion or similar damage to the vehicle structure over an extended period of time. Moreover, the spare tire is usually in the area of the exhaust pipe. Thus, it may not be desirable to have such tool access apertures in one or more structural members or body parts.

In the case where more than one aperture is provided in the vehicle structure for tool access, it is also sometimes difficult to guide the tool through the apertures. For example, an inner aperture on an inner body member of the vehicle may not be visible from the exterior of the vehicle. A person inserting the tool in the apertures may be required to make several blind attempts at extending the tool through the hidden aperture before successfully accessing the spare tire mechanism.

In view of the above, it will be apparent to those skilled in the art from this disclosure that there exists a need for an improved vehicle tool guide structure. This invention addresses this need in the art as well as other needs, which will become apparent to those skilled in the art from this disclosure.

SUMMARY OF THE INVENTION

It has been discovered that in order to protect structural members from ingress of contaminants, it is advantageous to provide a tool guide that extends through those structural members. The tool guide allows insertion of a tool but protects the structural members.

One object of the invention is to provide a tool guide structure that assists in the use of a tool inserted into apertures formed in structural members of a vehicle.

Another object of the invention is to provide protection against ingress of contaminants into a cavity formed between structural members of a vehicle.

In one embodiment of the present invention, a vehicle tool guide structure is provided that includes an inner body member, an outer body member and a tool guide tube. The inner body member includes an inner aperture. The outer body member includes an outer aperture. The outer body member is coupled to the inner body member to define a body cavity therebetween. The tool guide tube has an outer end portion with an outer opening, an inner end portion with an inner opening and a central tool guiding portion extending through the body cavity to define a tool passageway between the inner and outer body members. The outer end portion of the tool guide tube is located in the outer aperture of the outer body member and is rigidly attached to the outer body member. The inner end portion of the tool guide tube is located in the inner aperture of the inner body member and is coupled to the inner body member without a fastener.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
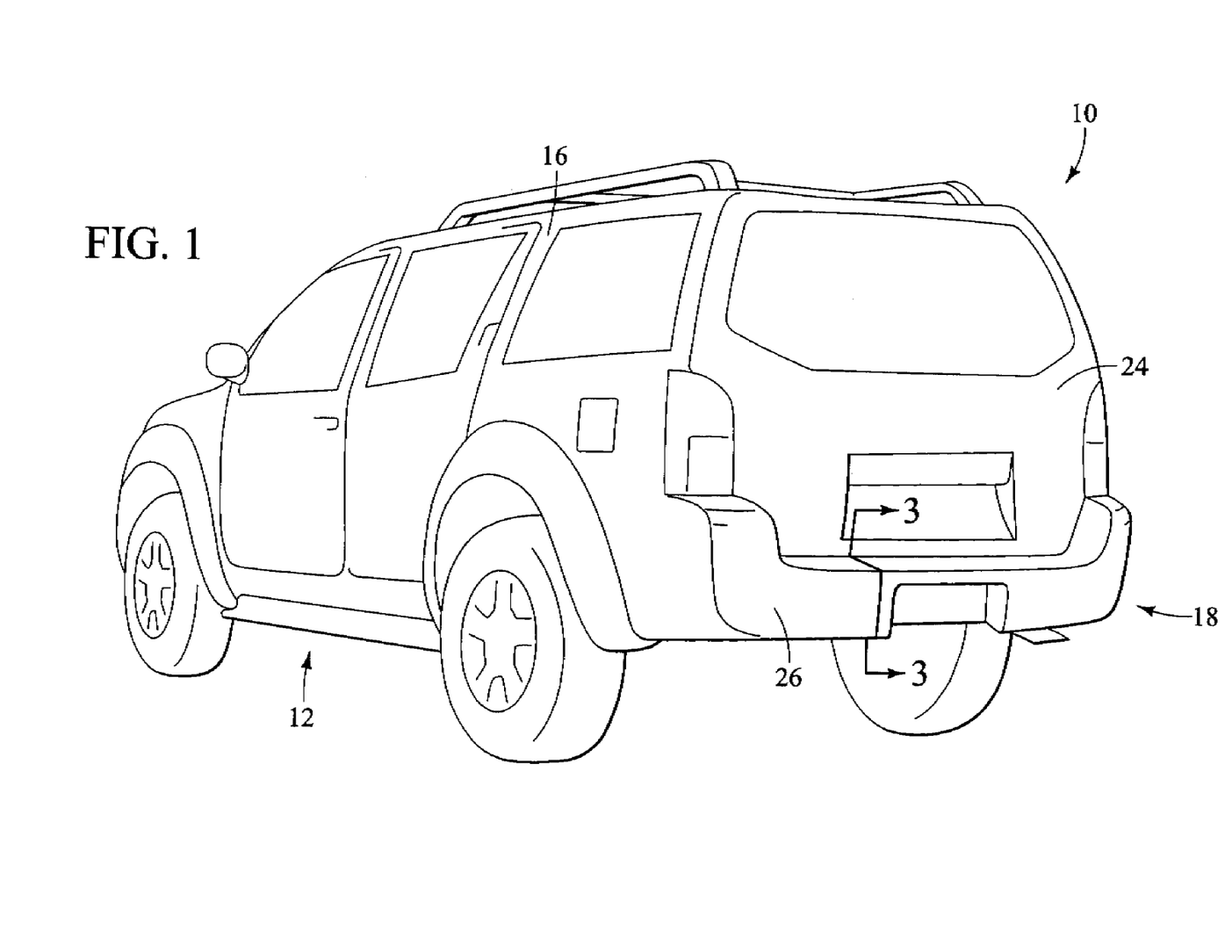
FIG. 1 is a rear perspective view of a vehicle having a vehicle tool guide structure in accordance with the present invention.
Figure 2:
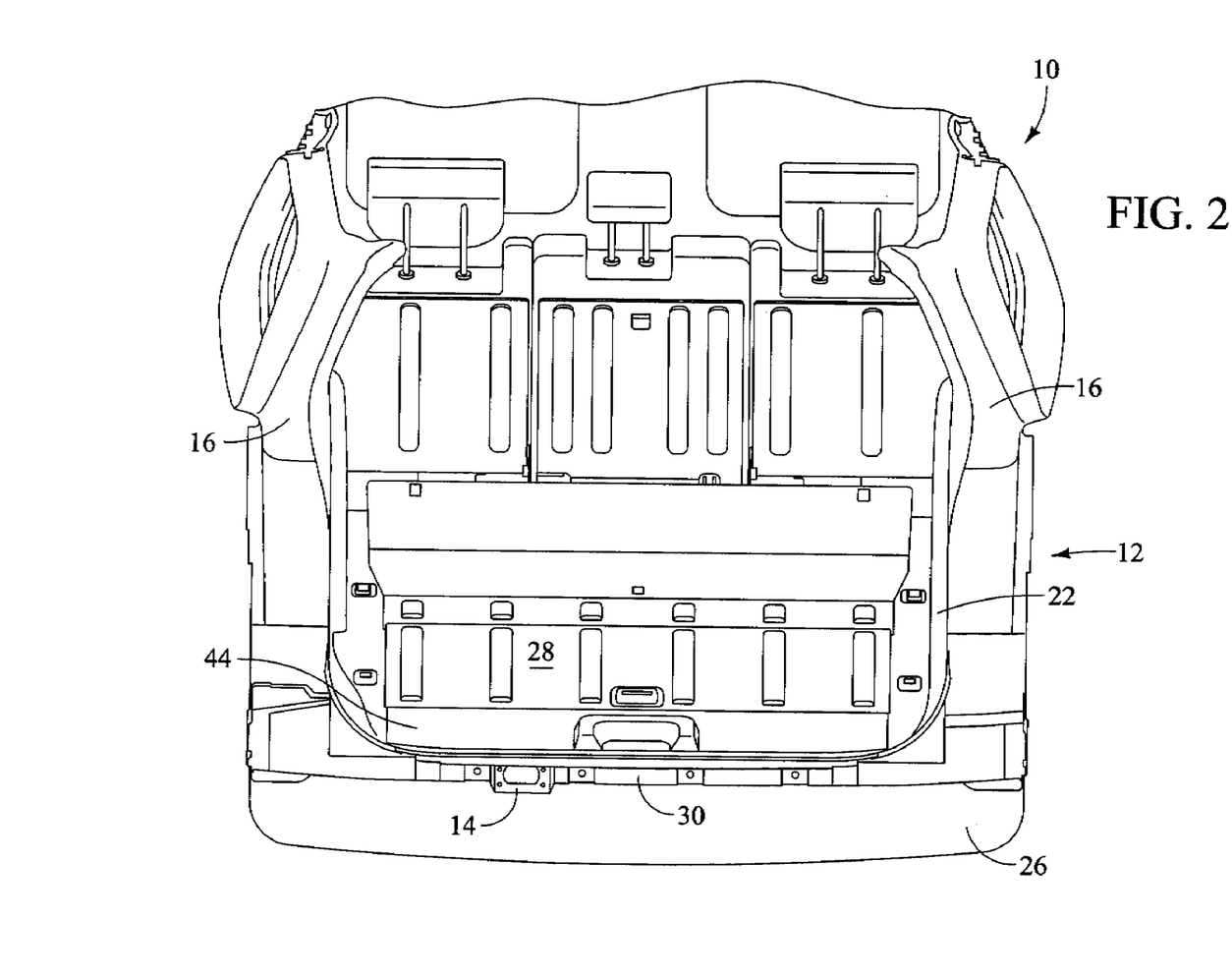
FIG. 2 is a rear perspective view of the rear portion of a vehicle with portions of the vehicle removed to show access to the tool guide tube in accordance with the present invention.

Referring initially to FIGS. 1 and 2, a vehicle 10 is illustrated that is configured with a vehicle body structure 12 that includes a tool guide tube 14 in accordance with a first embodiment of the present invention. The tool guide tube 14 of the present invention provides tool access from an easily accessed outer portion of the vehicle body structure 12 to a less accessible inner portion of the vehicle body structure 12, as is described in greater detail below. Only portions of the vehicle 10 shown in FIG. 1 are described below with respect to the present invention. It should be understood that many conventional elements of the vehicle 10, such as interior portions, exterior portions, suspension and drive train elements, have been omitted from the description for the sake of brevity.

The vehicle body structure 12 basically includes a pair of side wall portions 16 and a rear body portion 18 that are attached to one another via conventional means, such as welding and fastener technologies. The side wall portions 16 are conventional elements of the vehicle 10 that are non-movably coupled to one another to provide strength and rigidity to the vehicle 10. The side wall portions 16 are preferably made of a metal material, but can alternatively be made of polymers or composite materials suitable for providing strength and rigidity to a motorized vehicle, such as the vehicle 10.

Figure 3:
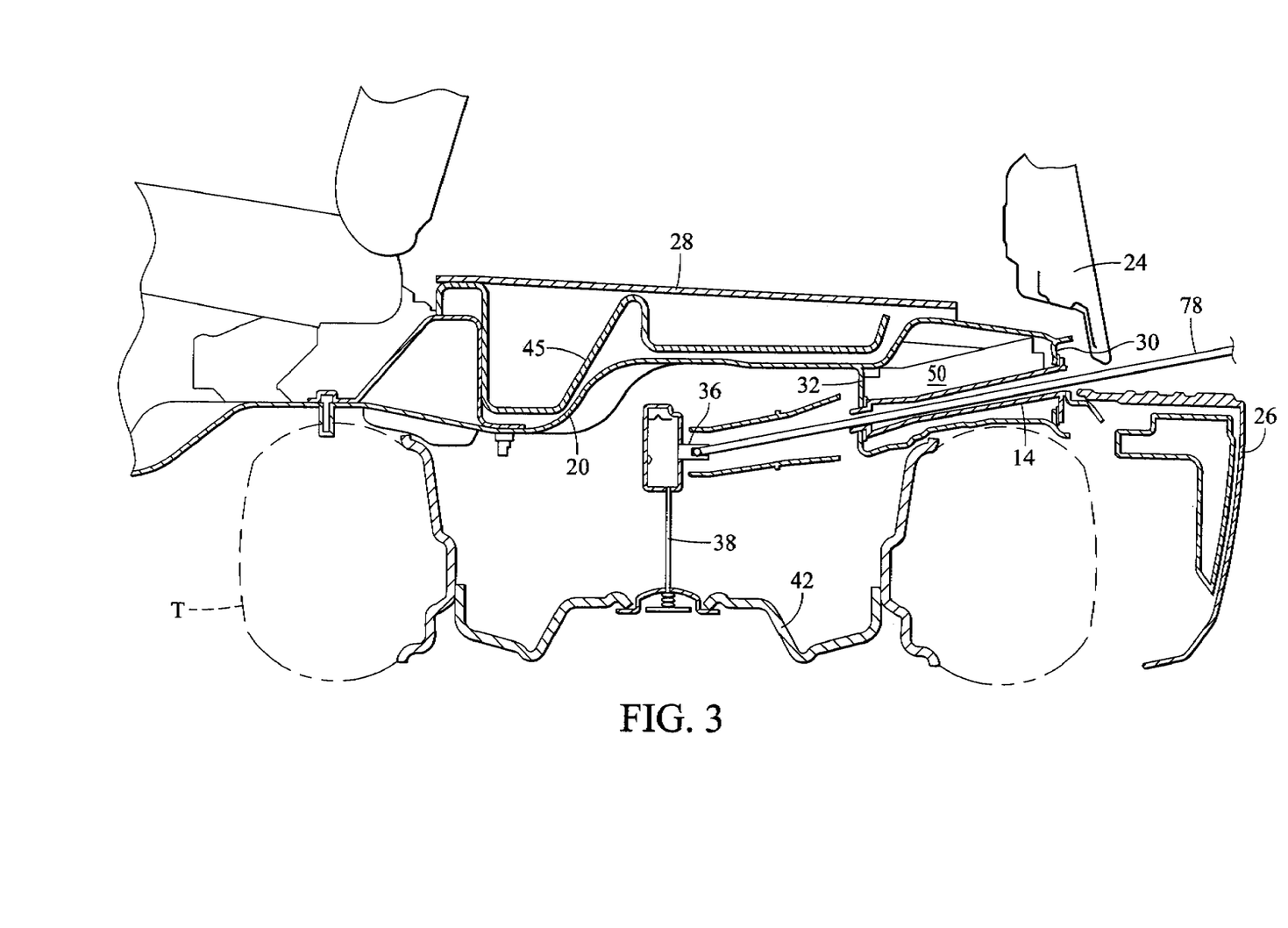
FIG. 3 is a side cross-sectional view of the rear portion of the vehicle, taken along the line 3—3 in FIG. 1, showing details of the tool guide tube with a rear hatch door partially open to allow insertion of a tool, in accordance with the present invention.

As shown in FIGS. 1, 2 and 3, the rear body portion 18 includes a support structure member 20 (FIG. 3), a rear door opening 22 (FIG. 2), a rear hatch door 24 (FIGS. 1 and 3), a bumper 26, an interior floor surface 28, an outer body member 30, an inner body member 32, and the tool guide tube 14.

Figure 4:
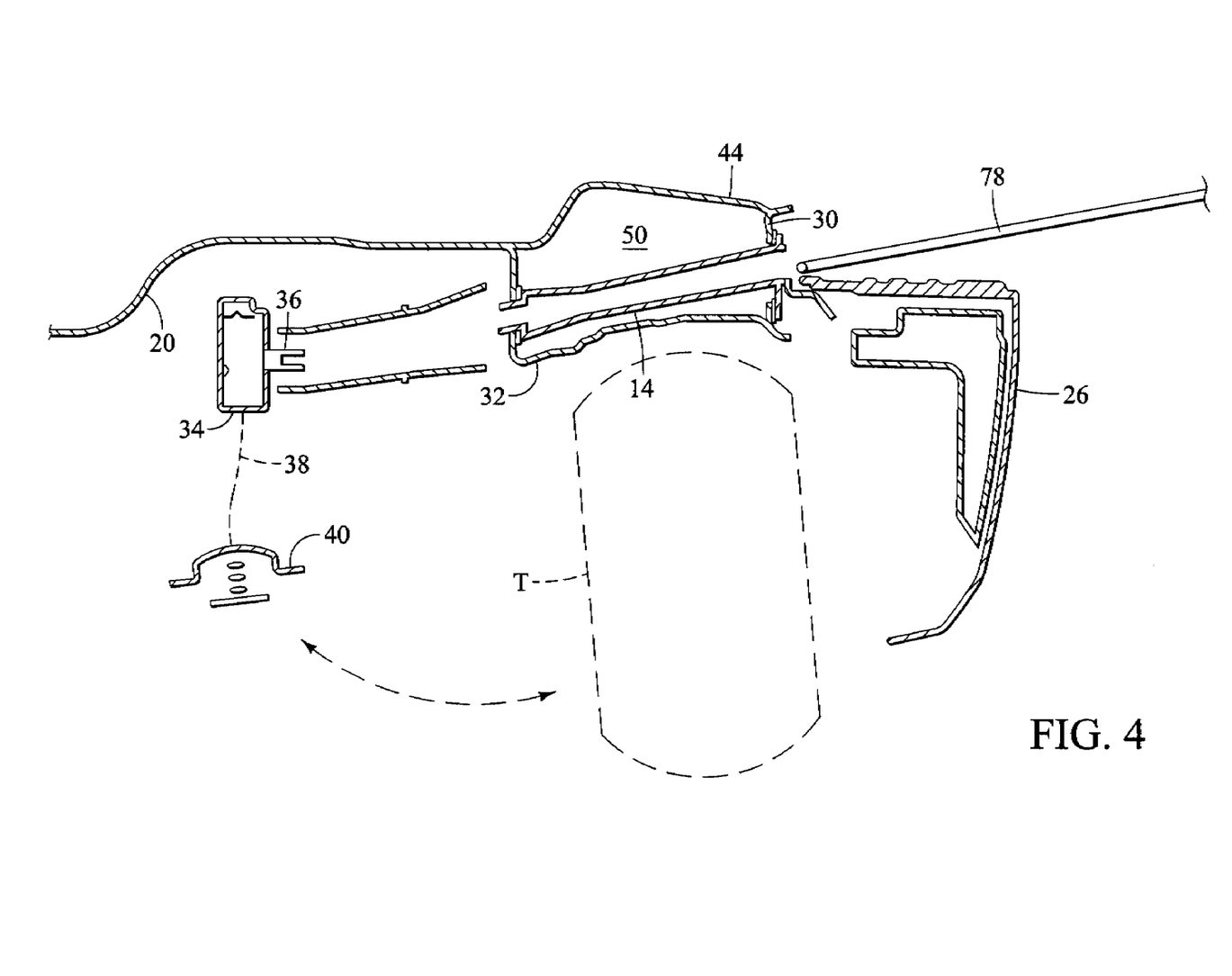
FIG. 4 is an enlarged cross-sectional view of the rear portion of the vehicle, similar to FIG. 3, showing further details of the tool guide tube in accordance with the present invention.

The support structure member 20 is connected to and supports the two side wall portions 16 in a conventional manner (not shown), such as welding techniques and/or fastener technologies. As shown in FIGS. 3 and 4, at least a portion of the support structure member 20 is exposed to the area under the vehicle 10. The support structure member 20 extends between the side wall portions 16 and in a rearward direction to the outer body member 30.

The support structure member 20 is configured and arranged within the vehicle body structure 12 to support a manually operated device, such as a spare tire retaining mechanism 34. The spare tire retaining mechanism 34 includes a rotatable operating member 36, an extensible member 38 and a support plate 40. The spare tire retaining mechanism 34 preferably includes gears and bearings (not shown) arranged and configured in a conventional manner for lowering, raising and retaining a spare tire T. The extensible member 38 is a rod or chain-like member that extends from the spare tire retaining mechanism 34 to the support plate 40. The support plate 40 is dimensioned to releasably support the inner hub of a rim 42 of the spare tire T. Typically, rotation of the rotatable operating member 36 controls movement of the extensible member 38, which in turn controls the positioning of the support plate 40. In other words, by rotating the rotatable operating member 36, the spare tire T can be lowered from a stored position (FIG. 3) under the vehicle 10 to release position (FIG. 4).

The rear door opening 22 basically includes a portion of the vehicle 10 and vehicle body structure 12 that is covered by the rear hatch door 24 when the rear hatch door 24 is closed. The rear door opening 22 further includes end surfaces of the side wall portions 16 and a door ledge 44 that is described in greater detail below.

The rear hatch door 24 is supported at the upper ends (not shown) of the side wall portions 16 for movement between a closed position (FIG. 1) and an open position (FIG. 2). With the rear hatch door 24 in the open position, the door ledge 44 and the tool guide tube 14 are visible, as shown in FIG. 2. When the rear hatch door 24 is in the closed position, the tool guide tube 14 and the door ledge 44 are covered by the lower end portion of the rear hatch door 24. With the rear hatch door 24 closed, tool access via the tool guide tube 14 is prevented.

The bumper 26 is located at the rear of the vehicle 10 adjacent to the door ledge 44. The bumper 26 has a conventional design and thus, will not be discussed in further detail.

The interior floor surface 28 extends between the two side wall portions 16. The interior floor surface 28 is shown as a cargo area, but can alternatively be a passenger seating area. In the depicted embodiment, the interior floor surface 28 is formed on a removable cover that conceals a storage compartment structure 45. The storage compartment structure 45 is rigidly fixed to the support structure member 20 and other portions (not shown) of the vehicle body structure 12. Alternatively, the interior floor surface 28 can be fixed to the side wall portions 16 and the storage compartment structure 45 omitted.

Figure 6:
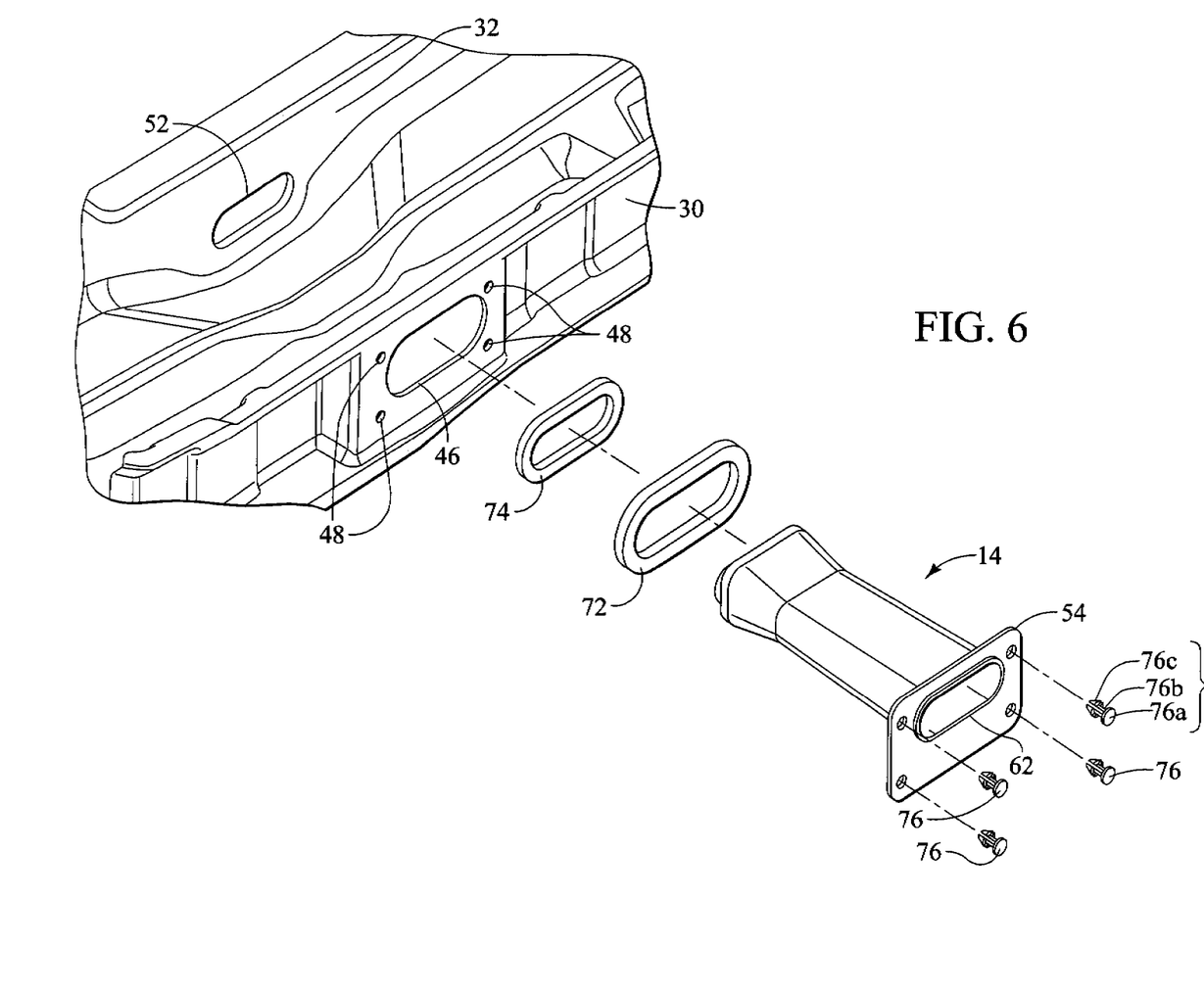
FIG. 6 is another exploded perspective view similar to FIG. 5 showing the rear portion of the vehicle with the door ledge and portions of the vehicle removed to show details of the installation of the tool guide tube in accordance with the present invention.
Figure 11:
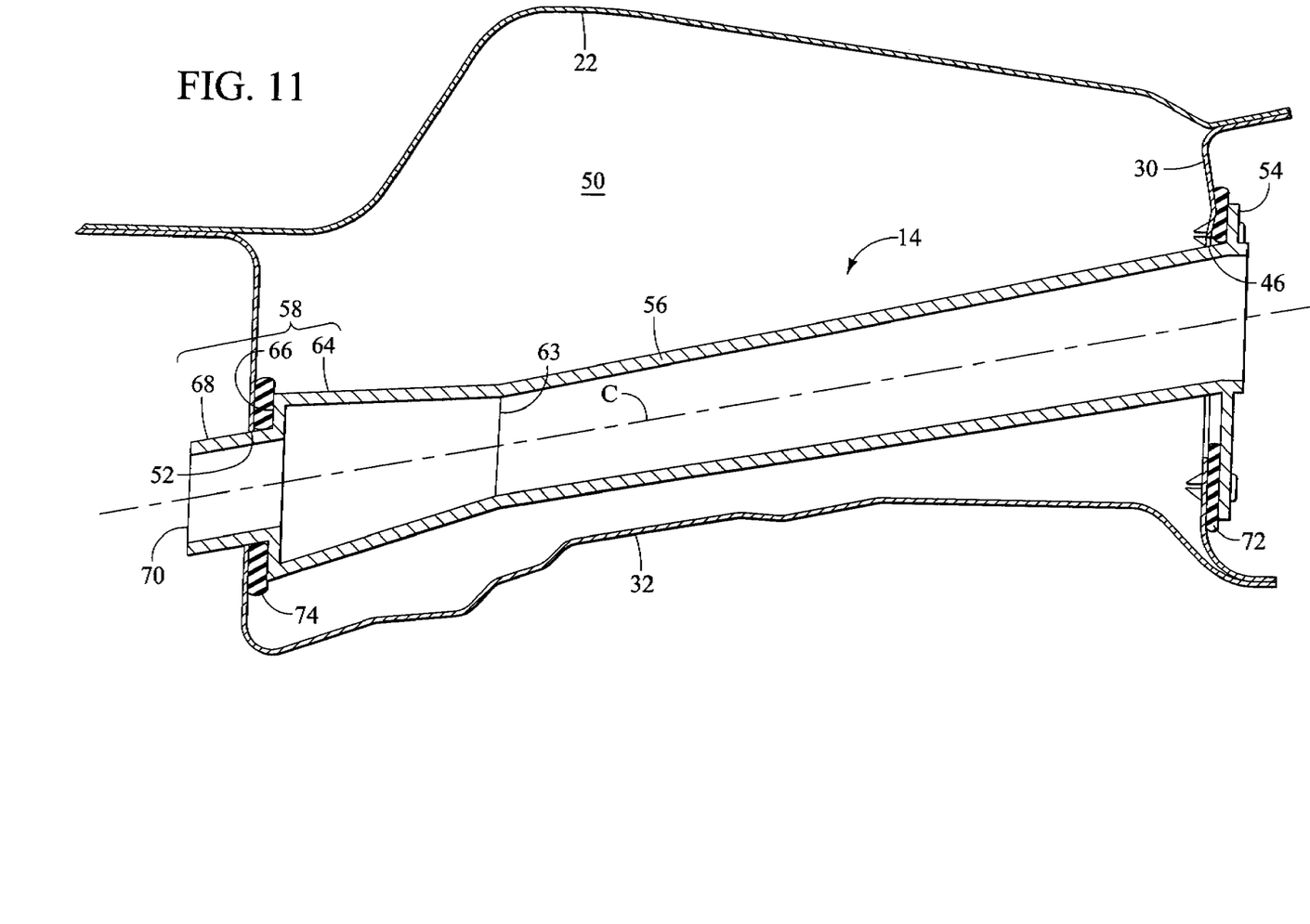
FIG. 11 is another cross-sectional view of the rear portion of the vehicle, similar to FIGS. 3 and 4, but on a further enlarged scale, showing further details of the tool guide tube in accordance with the present invention.

As shown in FIGS. 2, 3 and 4, the outer body member 30 is a structural member that is non-movably coupled to the side wall portions 16. The outer body member 30 is preferably made of metal but may alternatively be made of a rigid material, such as polymers, plastic or composite materials suitable for providing strength and structural stability to the vehicle 10. A rearward portion of the support structure member 20 and an upper portion of the outer body member 30 are non-movably fixed to one another forming the rear door ledge 44, as shown in FIG. 11. As shown in FIGS. 4, 6 and 11, the outer body member 30 includes an aperture 46 that receives a portion of the tool guide tube 14. The outer body member 30 is also formed with a plurality of fastener holes 48, as shown in FIG. 6. As indicated in FIG. 2, the tool guide tube 14 and the aperture 46 are off-center relative to the center of the outer body member 30 and the rear door ledge 44.

Figure 5:
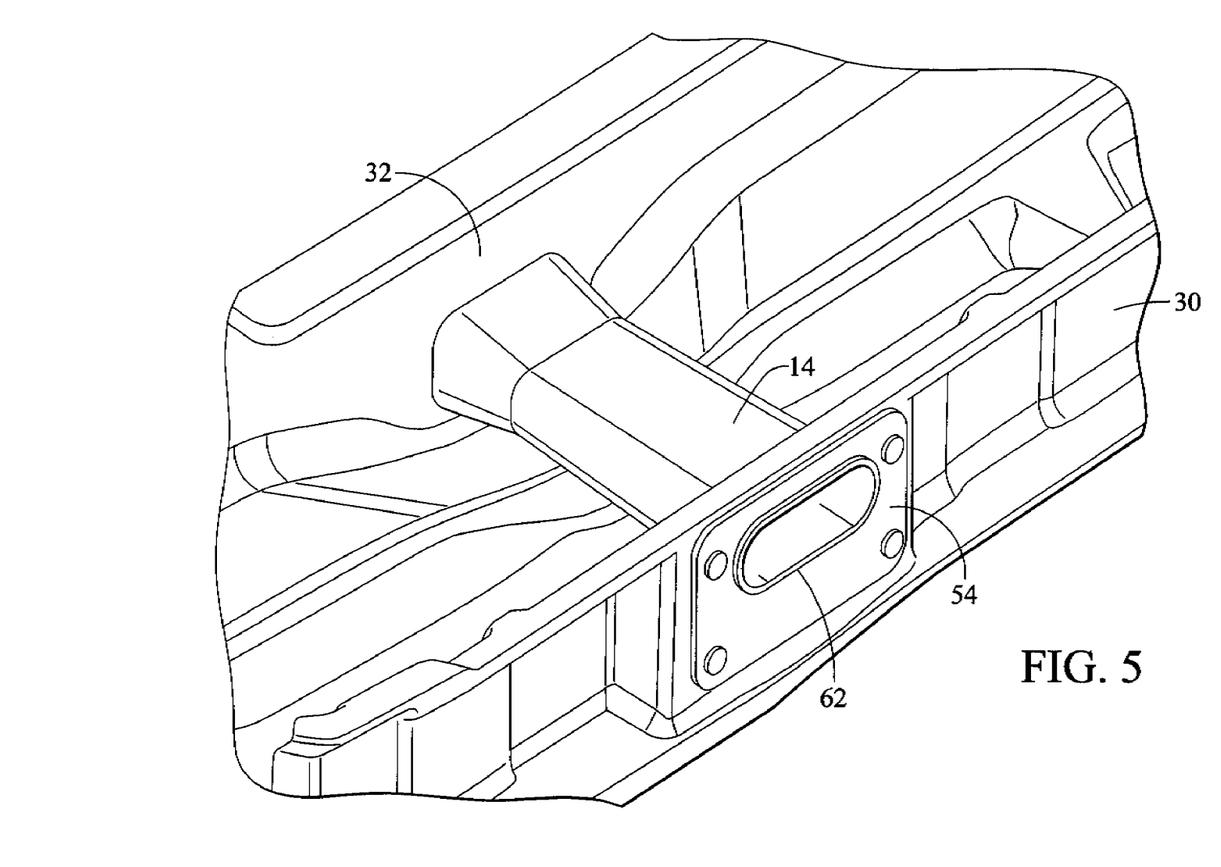
FIG. 5 is a perspective view of the rear portion of the vehicle with a door ledge and other portions of the vehicle removed to show details of the tool guide tube installation in accordance with the present invention.

As shown in FIGS. 3, 4 and 11, the inner body member 32 is a structural member that extends between a portion of the support structure member 20 and a lower portion of the outer body member 30. The inner body member 32 is preferably made of metal but may alternatively be made of any rigid material, such as polymers, plastic or composite materials suitable for providing strength and structural stability to the vehicle 10. A forward portion of the inner body member 32 is non-movably fixed to the support structure member 20 by, for instance, welding techniques. A rearward portion of the inner body member 32 is similarly non-movably fixed to the outer body member 30 defining a inner cavity 50 therebetween. The inner body member 32 is formed with an aperture 52, as shown in FIGS. 5, 6 and 11. The aperture 52 in the inner body member 32 is smaller than the aperture 46 in the outer body member 30. Further, the aperture 52 and aperture 46 are not horizontally or vertically aligned with respect to one another and with respect to the vehicle 10. As is described in greater detail below, the tool guide tube 14 extends through both the apertures 46 and 52 sealing the cavity 50 against intrusion by contaminants. Further, the tool guide tube 14 defines a tool passageway through the cavity 50 that provides easy access to the spare tire mechanism 34, as shown in FIG. 4.

Description of the tool guide tube 14 of the present invention is now provided with reference to FIGS. 6–11. The tool guide tube 14 basically includes an outer end portion 54, a central tool guiding portion 56, and an inner end portion 58. The outer end portion 54 is essentially a flat plate or planar flange that provides attachment areas for the tool guide tube 14. Specifically, the outer end portion 54 is formed with four apertures 60 that are configured to be aligned with the fastener holes 48 in the outer body member 30 when the tool guide tube 14 is installed. The outer end portion 54 is also formed with an opening 62.

The central tool guiding portion 56 is an elongated tube having a hollow interior. The central tool guiding portion 56 generally has rectangular shape with rounded corners. However, interior dimensions of the central tool guiding portion 56 diminish slightly going from the outer end portion 54 toward the inner end portion 58. As a result, the hollow interior of the central tool guiding portion 56 tapers going from the outer end portion 54 toward the inner end portion 58 to a tapered end 63. Consequently, the hollow interior of the central tool guiding portion 56 serves as a funnel to guide a tool toward the spare tire retaining mechanism 34.

Figure 7:
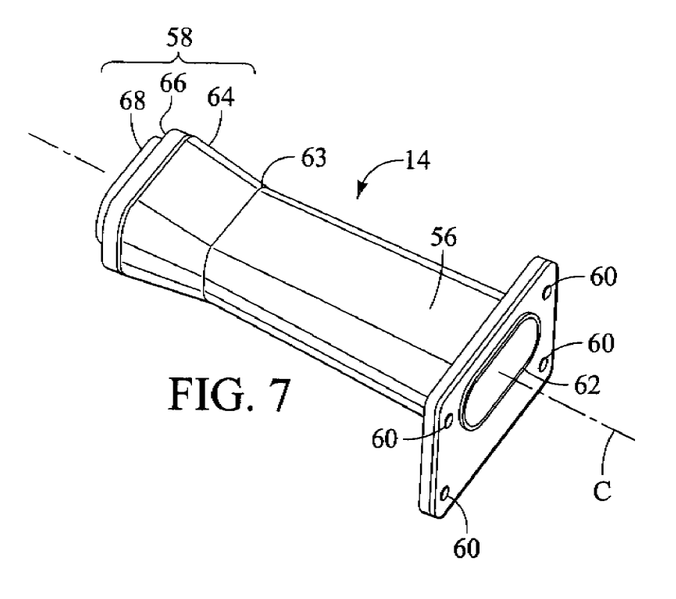
FIG. 7 is a perspective view of the tool guide tube removed from the vehicle, in accordance with the present invention.
Figure 8:
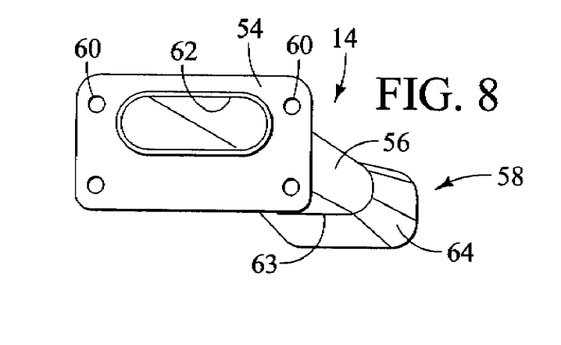
FIG. 8 is a rear elevational view of the tool guide tube removed from the vehicle, in accordance with the present invention.
Figure 9:
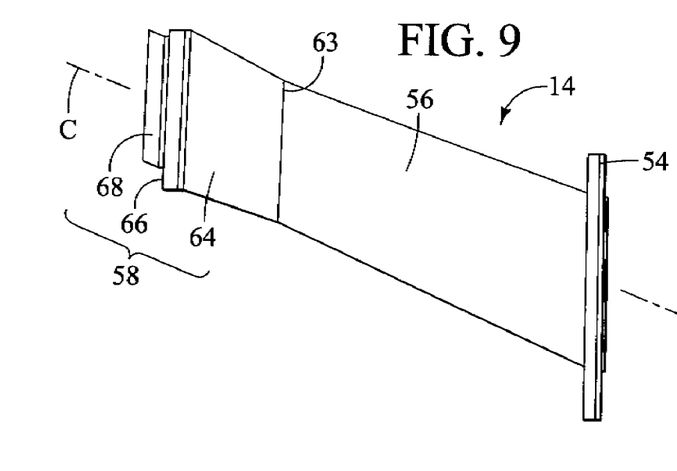
FIG. 9 is a top plan view of the tool guide tube removed from the vehicle, in accordance with the present invention.
Figure 10:
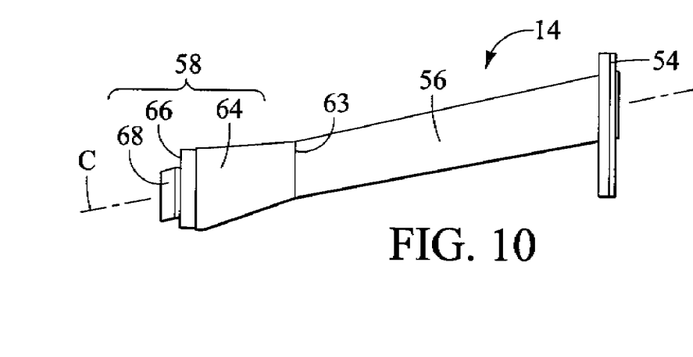
FIG. 10 is a side elevational view of the tool guide tube removed from the vehicle, in accordance with the present invention.

The hollow interior of the central guiding portion 56 defines a central axis C. The central tool guiding portion 56 is non-movably fixed to the outer end portion 54. The hollow interior of the central tool guiding portion 56 is aligned with the opening 62 of the outer end portion 54. Consequently, the central axis C passes through a center of the opening 62. As can be seen in FIGS. 7, 9 and 10, the central axis C is not perpendicular to the outer end portion 54.

The inner end portion 58 basically includes a diverging section 64, an abutment surface 66, and a locating part 68. The diverging section 64 is non-movably fixed to the tapered end 63 of the central tool guiding portion 56. Since the diverging section 64 becomes larger away from the outer end portion 54, the diverging section 64 has sufficient size to form and support the abutment surface 66, as described below.

The abutment surface 66 is a generally flat surface that extends radially inwardly from the diverging section 64 toward the central axis C and radially outward from the locating part 68. The abutment surface 66 is oriented in a plane that is parallel to the outer end portion 54, as shown in FIGS. 9 and 10. The locating part 68 is a tube-like element similar to the central tool guiding portion 56. The locating part 68 includes an inner opening 70. The locating part 68 and the inner opening 70 are aligned with the tapered end 63 of the central tool guiding portion 56, as shown in FIG. 11.

The tool guiding tube 14 is configured and arranged to provide tool access that is offset in both vertical and horizontal directions with respect to the outer end portion 54. Specifically, as shown in the top view in FIG. 9, the central tool guiding portion 56 extends at an angle from the outer end portion 54 providing a horizontal offset between the outer opening 62 in the outer end portion 54 and the inner opening 70 in the inner end portion 58 of the tool guiding tube 14. Further, as shown in the side views of FIGS. 10 and 11, the central tool guiding portion 56 extends at an angle from the outer end portion 54 providing a vertical offset between the outer opening 62 in the outer end portion 54 and the inner opening 70 in the inner end portion 58 of the tool guiding tube 14.

The tool guide tube 14 can be manufactured using many methods and materials. In the depicted embodiment, the tool guide tube 14 is made of a metallic material. The outer end portion 54, the central tool guiding portion 56 and the inner end portion 58 can be separately formed and welded together, or portions thereof formed together as an integral unit. Further, the diverging section 64, the abutment surface 66, and the locating part 68 can be formed as a single unitary element or can be formed separately and welded together. As well, the tool guiding portion 56 can be made of a plastic, polymer or composite material and formed as a single unitary member.

Description of the installation of the tool guide tube 14 is now provided with specific reference to FIGS. 5, 6 and 11. Installation of the tool guide tube 14 includes the use of an outer seal 72, an inner seal 74 and fasteners 76, shown in FIGS. 6 and 11. The outer seal 72 is a ring-like member made of a resilient material that provides a water-tight seal when installed. The outer seal 72 is positioned between the inner side of the outer end portion 54 of the tool guide tube 14 and an outer surface of the outer body member 30, as shown in FIG. 11. The inner seal 74 is a ring-like member made of a resilient material that provides a water-tight seal when installed. The inner seal 74 is positioned between the abutment surface 66 and the outer side of the inner body member 32, as shown in FIG. 11.

The fasteners 76 are preferably push clips having resilient properties and includes a head portion 76a, shaft portions 76b and resilient protrusions 76c. The fasteners 76 can be made of a metal material or a plastic material having the resiliency and strength to hold the tool guide tube 14 in position once installed.

During installation, the tool guide tube 14 is inserted into the aperture 46 in the outer body member 30. Specifically, the central tool guiding portion 56 and inner end portion 58 are inserted completely into the aperture 46 until outer seal 72 is pressed against the outer body member 30 by the outer end portion 54. Simultaneously, the locating part 68 of the inner end portion 58 is inserted into the aperture 52 of the inner body member 32 pressing the inner seal 74 between the inner body member 32 and the abutment surface 66. The fasteners 76 are then inserted into apertures 60 of the outer end portion 54, and further into the fastener holes 48 of the outer body member 30. As the fasteners 76 are forced into the fastener holes 48, the shaft portions 76b are temporarily bent toward one another until the resilient protrusions 76c engage an inner surface of the outer body member 30, as shown in FIG. 11.

As is shown in FIG. 11, the locating part 68 of the tool guide tube 14 is retained in the aperture 52 of the inner body member 32 as a result of the fasteners 76 installed in the outer end portion 58. It should also be appreciated from the drawings and the description herein that the tool guide tube 14 is dimensioned such that the abutment surface 66 presses the inner seal 74 against the inner body member 32. Therefore, no fasteners are necessary in the inner body member 32. The fasteners 76 hold the tool guide tube 14 firmly on the outer body member 30 and prevent movement with respect to the inner body member 32.

Referring again to FIG. 4, the locating part 68 protrudes through the inner body member 32 at a position proximate to the spare tire retaining mechanism 34. Consequently, a tool 78 can be inserted into opening 62 of the outer end portion 54 of the tool guide tube 14. The tool 78 is guided by the inner surface of the central tool guiding portion 56 to the inner opening 70 of the locating part 68 and to the spare tire retaining mechanism 34.

Since the tool guiding structure 14 includes the outer and inner seals 72 and 74, the inner cavity 50 is protected from water, debris and other contaminants that might harm the structural advantages of the outer and inner body members 30 and 32. With the vertical and horizontal offset design of the tool guiding structure 14, the tool 78 can be guided from an off-centered portion of the rear of the vehicle 10 to the spare tire retaining mechanism 34. As well, the vertical and horizontal offset design allows water and debris that can enter the tool guide tube 14 to drain out.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The phrase "non-fixedly fastened" as used herein means a connection that does not include a mechanical fastener, but does include a connection made with friction or an adhesive material. Also terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle tool guide structure comprising:
an inner body member including an inner aperture;
an outer body member including an outer aperture, the outer body member being coupled to the inner body member to define a body cavity therebetween; and
a tool guide tube having an outer end portion with an outer opening, an inner end portion with an inner opening and a central tool guiding portion extending through the body cavity to define a tool passageway between the inner and outer body members,
the outer end portion of the tool guide tube being located in the outer aperture of the outer body member and the inner end portion of the tool guide tube being located in the inner aperture of the inner body member, with the inner end portion and the central tool guiding portion having a smaller overall cross-sectional area than the outer aperture of the outer body member such that the inner end portion and the central tool guiding portion are insertable through the outer aperture in the outer body member.

2. The vehicle arrangement as set forth in claim 1, wherein
the tool guide tube includes a tapered end and a locating part that includes an inner opening, with the tapered end and the inner opening being aligned with one another.

3. The vehicle arrangement as set forth in claim 1, wherein
the tool guide tube is made of a plastic material.

4. The vehicle arrangement as set forth in claim 1, wherein
the outer end portion of the tool guide tube includes a mounting flange that covers a portion of the outer member surrounding the outer aperture of the outer member.

5. The vehicle arrangement as set forth in claim 4, wherein
the inner end of the tool guide tube extends radially to create an abutment surface.

6. The vehicle arrangement as set forth in claim 5, wherein
the mounting flange on the outer end of the tool guide tube and the abutment surface extending from the inner end of the tool guide tube are parallel to one another.

7. A vehicle tool guide structure comprising:
an inner body member including an inner aperture;
an outer body member including an outer aperture, the outer body member being coupled to the inner body member to define a body cavity therebetween; and
a tool guide tube having an outer end portion with an outer opening, an inner end portion with an inner opening and a central tool guiding portion extending through the body cavity to define a tool passageway between the inner and outer body members,
the outer end portion of the tool guide tube being located in the outer aperture of the outer body member and being rigidly attached to the outer body member, and the inner end portion of the tool guide tube being located in the inner aperture of the inner body member and being coupled to the inner body member without a fastener, and
the inner end portion of the tool guide tube includes an assembly locating part that is disposed in the inner aperture of the inner body member and an abutment surface extending radially from the locating part.

8. The vehicle tool guide structure as set forth in claim 7, wherein
the inner aperture in the inner body member is smaller than the outer aperture in the outer body member.

9. The vehicle tool guide structure as set forth in claim 7, wherein
an outer body member forms a portion of a door ledge of a vehicle door opening that is concealed by a door that is received in the vehicle door opening.

10. The vehicle tool guide structure as set forth in claim 7, wherein
the outer opening of the tool guide tube is offset vertically and horizontally relative to the inner aperture in the inner body member.

11. The vehicle tool guide structure as set forth in claim 7, further comprising
an outer seal disposed between the outer end portion of the tool guide tube and the outer body member to create a seal that prevents ingress of containments into the body cavity between the outer aperture of the outer body member and the outer end portion of the tool guide tube.

12. The vehicle arrangement as set forth in claim 7, wherein
the inner end of the tool guide tube includes a tapered end and the locating part includes an inner opening with the tapered end and the inner opening being aligned with one another.

13. The vehicle arrangement as set forth in claim 7, wherein the tool guide tube is made of a plastic material.

14. The vehicle arrangement as set forth in claim 7, wherein
the inner end of the tool guide tube is tapered to create the radially extending abutment surface.

15. The vehicle tool guide structure as set forth in claim 7, further comprising
an inner seal disposed between the inner end portion of the tool guide tube and the inner body member to create a seal that prevents ingress of containments into the body cavity between the inner aperture of the inner body member and the inner end portion of the tool guide tube.

16. The vehicle tool guide structure as set forth in claim 15, further comprising
an outer seal disposed between the outer end portion of the tool guide tube and the outer body member to create a seal that prevents ingress of containments into the body cavity between the outer aperture of the outer body member and the outer end portion of the tool guide tube.

17. The vehicle tool guide structure as set forth in claim 16, wherein the outer end portion of the tool guide tube has a mounting flange extending in a radial direction relative to a center axis of the tool passageway, with the outer seal being disposed between the mounting flange and the outer body member.

18. The vehicle tool guide structure as set forth in claim 17, wherein
the inner seal is disposed between the abutment surface and the inner body member.

19. The vehicle tool guide structure as set forth in claim 7, wherein
the outer end portion of the tool guide tube has a mounting flange extending in a radial direction relative to a center axis of the tool passageway.

20. The vehicle arrangement as set forth in claim 19, wherein
the mounting flange covers a portion of the outer member surrounding the outer aperture of the outer member.

21. The vehicle arrangement as set forth in claim 19, wherein
the mounting flange on the outer end of the tool guide tube and the abutment surface extending from the inner end of the tool guide tube are parallel to one another.

22. The vehicle tool guide structure as set forth in claim 19, wherein
the mounting flange is a continuous annular member with a plurality of mounting holes and the outer body member has a plurality of mounting holes with fasteners disposed within the mounting holes to rigidly attach the mounting flange to the outer body member.

23. The vehicle tool guide structure as set forth in claim 22, wherein
the fasteners are push clips that have a head portion and a shaft portion with a resilient retaining portion.

24. A vehicle arrangement comprising:
a vehicle body section including a supporting structure, an inner body member with an inner aperture, an outer body member with an outer aperture, the outer body member being coupled to the inner body member to define a body cavity therebetween;
a manually operated mechanism supported on the supporting structure;
a tool guide tube coupled to the inner and outer body members and extending through the body cavity to define a tool passageway between the inner and outer body members, an inner end portion of the tool guide tube being located in a position proximate the manually operated mechanism to be accessed and operated through the tool passageway, the inner end portion of the tool guide tube also includes an assembly locating part that is disposed in the inner aperture of the inner body member and an abutment surface extending radially from the locating part: and
an inner seal disposed between the abutment surface of the inner end portion of the tool guide tube and the inner body member to create a seal that prevents ingress of containments into the body cavity between the inner aperture of the inner body member and the inner end portion of the tool guide tube.

25. The vehicle arrangement as set forth in claim 24, wherein
the tool guide tube further includes an outer end portion with an outer opening, the outer end portion of the tool guide tube being located in the outer aperture of the outer body member and being rigidly attached to the outer body member, and the inner end portion of the tool guide tube being coupled to the inner body member without a fastener.

26. The vehicle arrangement as set forth in claim 24, wherein
the supporting structure is configured and arranged to support a spare tire; and
the manually operated mechanism is a spare tire supporting mechanism.

27. The vehicle arrangement as set forth in claim 24, further comprising
an outer seal disposed between an outer end portion of the tool guide tube and the outer body member to create a seal that prevents ingress of containments into the body cavity between the outer aperture of the outer body member and the outer end portion of the tool guide tube.

28. The vehicle arrangement as set forth in claim 27, wherein
the outer end portion of the tool guide tube has a mounting flange extending in a radial direction relative to a center axis of the tool passageway, with the outer seal being disposed between the mounting flange and the outer body member.

* * * * *